United States Patent [19]

Firth

[11] 4,289,233
[45] Sep. 15, 1981

[54] PACKAGING OF MUTUALLY REACTIVE SUBSTANCES

[75] Inventor: Francis G. Firth, Los Angeles, Calif.

[73] Assignee: Applied Plastics Co., Inc., El Segundo, Calif.

[21] Appl. No.: 85,128

[22] Filed: Oct. 15, 1979

Related U.S. Application Data

[60] Continuation of Ser. No. 905,449, May 12, 1978, abandoned, which is a division of Ser. No. 747,612, Dec. 6, 1976, Pat. No. 4,116,742.

[51] Int. Cl.³ .................. B65D 81/32; B65D 25/08
[52] U.S. Cl. .................................. 206/221; 206/219; 428/413
[58] Field of Search .......................... 206/219–222; 156/330; 428/413; 264/129, 130, 171, 557

[56] References Cited

U.S. PATENT DOCUMENTS

| 3,324,663 | 6/1967 | McLean | 206/219 X |
| 3,519,250 | 7/1970 | Tibbs | 206/221 X |
| 3,632,467 | 1/1972 | Todd et al. | 264/171 X |
| 3,731,791 | 5/1973 | Fouriade et al. | 206/219 |
| 3,756,388 | 9/1973 | Murphy | 206/219 |
| 3,837,981 | 9/1974 | Flint | 428/413 X |
| 3,976,530 | 8/1976 | Callan | 264/171 |
| 4,007,831 | 2/1977 | Bernhardt | 206/219 |

FOREIGN PATENT DOCUMENTS

| 646446 | 7/1964 | Belgium | 206/219 |
| 672549 | 10/1963 | Canada | 206/219 |
| 2349051 | 4/1975 | Fed. Rep. of Germany | 206/219 |
| 2029823 | 10/1970 | France | 206/219 |

Primary Examiner—Stephen Marcus
Attorney, Agent, or Firm—William W. Haefliger

[57] ABSTRACT

A thin barrier is provided between two reactive masses, as during extrusion thereof, to block their reaction until such time as they are intermixed, as by kneading.

3 Claims, 10 Drawing Figures

PACKAGING OF MUTUALLY REACTIVE SUBSTANCES

This is a continuation, of application Ser. No. 905,449, filed May 12, 1978, now abandoned, which was a division of Ser. No. 747,612, filed Dec. 6, 1976, now U.S. Pat. No. 4,116,742.

BACKGROUND OF THE INVENTION

This invention relates generally to packaging of reactive materials, and more particularly concerns the provision of a thin barrier between two reactive masses, as during extrusion thereof, to block their reaction until such time as they are intermixed, as by kneading.

When two or more thickened, heavy pastes or putty-like masses are laid, placed or extruded adjacent one another, but not in contact, protection against unintentional touching is required. While materials such as glass, paper, foil or other impervious components may be employed, they are not convenient when it is desired that the reactive materials be made available for mixing without having to physically remove the barrier. One known method of avoiding physical barriers involves decreasing the reactivity of the two masses, as by high dilution or by the use of low functionality materials; however, decreased reactively is a disadvantage. Another expedient involves formation of very stiff masses that do not intermix on contact due to their extreme immobility; however, mixing is then difficult, application of the stiff material to cavities requires undesirably high pressure, and adhesion to surfaces is poor due to low wettability.

Advantages to be gained through use of a soft, highly reactive, plural component, solid package are as follows:
- (a) Easy mixing
- (b) Faster cure
- (c) Better adhesion to surfaces
- (d) Easier application to forming shapes, cavity filling, and contour formation.

SUMMARY OF THE INVENTION

An important object of the invention is to provide protection between mutually reactive materials through use of an in situ applied thin film that is impervious to either reactive component, but which is thin enough to become essentially dispersed within the mixed mass. Such a film is characterized as having very low mass, as being thin and easily broken or fragmented, and yet as having sufficient elongation as to withstand normal handling.

Basically, the method of packaging kneadable plastic masses that react when intermixed involves the step of interposing a thin, flexible barrier between the masses to block their contact until such time as they are intentionally kneaded or mixed together for reaction. Typically, the masses are provided by extending two mutually reactive substances into close side-by-side relation.

Further, the barrier may be provided in the form of a film, coating that portion of at least one mass that is closest the other; the masses are typically guided into close side-by-side relation with the barrier located therebetween; the film may be applied in liquid form and may consist of a film former dissolved in a solvent; the film may be fed as a solid strip between the masses, and consist of a thermoplastic film; the thermoplastic film may also extend beneath the masses as a carrier therefor; and one or two such films may be employed, as will be seen.

These and other objects and advantages of the invention, as well as the details of illustrative embodiments, will be more fully understood from the following description and drawings, in which:

DRAWING DESCRIPTION

DETAILED DESCRIPTION

As referred to above, the method of packaging kneadable plastic masses that react when mixed includes the step of interposing a thin, flexible barrier between the two masses, as for example during their extrusion into close side-by-side relation, thereby to block physical contact of the masses until they are intentionally kneaded together for reaction. Typically, such kneading is carried out by hand, although other methods are usable.

Figure 1:
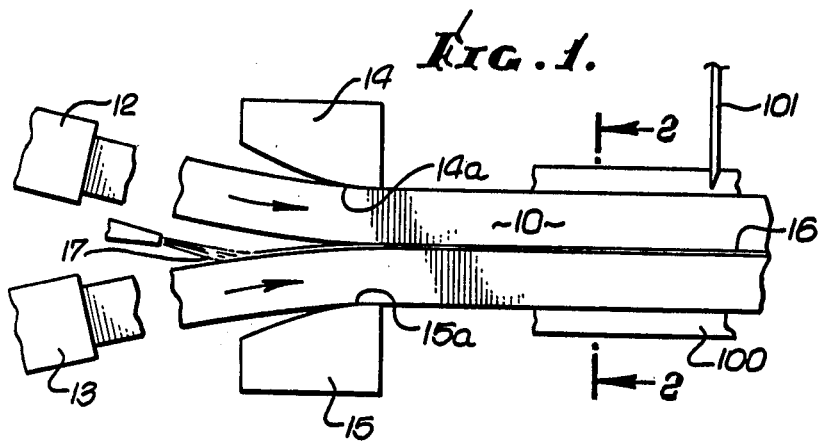
FIG. 1 is a plan view of a barrier film application to the edge of an reactive mass being extruded as a ribbon or tube, another mass also being extruded.

In the first example shown in FIG. 1, the two plastic masses are extruded longitudinally as bands 10 and 11, as by suitable extruders 12 and 13. Such masses typically have a putty-like consistency, and they are displaced laterally by guides 14 and 15 into close side-by-side relation, the guides having guide surfaces 14a and 15a as shown. A moving support for the masses may take the form of a belt 100 (not shown in FIG. 1, but seen in FIG. 2). A cut-off knife appears at 101.

The thin flexible barrier 16 interposed between the masses or bands is provided in the form of a neutral film, which may be applied in liquid form to an edge portion of one mass, as for example band 11, closest to band 10. Note for example the spray application at 17.

Referring to the composition of the bands 10 and 11, after suitable additions of bulking fillers examples are as follows:

| BAND 10 | BAND 11 (curing agent) |
| --- | --- |
| epoxy resin | polyfunctional amine |
| polyisocyanate | polyol and catalyst |
| phenolic resin | acidic catalyst |
| unsaturated elastomers (rubbers) | peroxides and plasticizers |

The epoxy resin in the above first example typically has an epoxy equivalent weight in the range 190 or less, and the two masses or bands 10 and 11 have a putty-like consistency.

The spray 17 may consist of a solution of an impermeable film former such as polyvinyl pyrolidone in alcohol. The film former must be soluble in a solvent that will not easily dissolve or transfer reactive ingredients between the two thixotropic masses 10 and 11. The solvent should be easily removable as by evaporation, with or without additional heat from external sources. The film former should not react with, or be permeable to the reactive ingredients in either mass; it should be capable of forming an intact film on irregular surfaces; its elongation or stretch characteristics should be greater than any expected movement due to handling of the product; it should have little cohesive strength beyond its elongation limits, to enable kneading and mixing of the masses for reaction; and it should be capable of forming a thin cross-section out of solution.

Suitable film former solvents include water, alcohol, ketones, esters, hydrocarbons, etc; and suitable film formers include natural and synthetic gums, elastomeric rubber-like materials such as polybutadiene, silicone rubber, isoprene elastomers, ethylene-propylene rubber, synthetic vinyl compounds such as vinyl acetate, vinyl chloride copolymers, polyvinyl pyrolidone and copolymers; cellulosic polymers, acrylic derivatives, allyl resins, polycarbonate resin, alkyd resins, polystyrene and styrene butadiene elastomers and urethanes. Selection of the film former is related to potential chemical attack and permeability to any of the reactive components; for example, vinyl chloride films or other halogenated polymers would not be selected for use as a barrier in contact with a mass which contains primary amine due to deterioration and darkening of the film with time.

EXAMPLE 1

A first epoxy heavy mass is formed by mixing fillers and thixotropic agents into a reactive epoxy resin with an epoxy equivalent weight of 190 grams or less. A second, reactive, non-flowing mass is formed of a mixture of polyamines and fillers, so that a known volume of the epoxy component requires a specific volume of the amine reactive component.

A shaping technique such as die forming, extrusion, or molding, is used to produce suitable compatible nesting or parallel shapes. One component, or both, are then coated with the film former comprising an alcohol solution or polyvinyl pyrolidone-maleic acid copolymer, and allowed to dry. The shapes are then placed in juxtaposition with the coated side in between, and overwrapped with a protective cover of film. After a prolonged storage period, the material was examined, and no hardening or changes had occurred at the interface. Upon mixing the two component masses, the resultant, compound had cured, and no trade of the film was apparent.

EXAMPLE 2

A mineral filled thixotropic mass is prepared by blending in a double sigma mixer, finely powdered anhydrous calcium carbonate, and a prepolymer made from polymeric isocyanate and polyol. A second mass is similarly prepared by substituting a mixture of a polyol and amine catalyst, so that an approximately stoichiometric ratio is obtained when equal volumes of the isocyanate and polyol amine components are mixed together.

When the two reactive components are placed in juxtaposition so that intimate contact is maintained between the masses, it was found that a hard intermediate layer had formed after several days, due to the surface interaction of the two reactive surfaces. A second sample was prepared similarly, except that a barrier film was laid down between the two masses. The film consisted of a polybutadiene rubber laid down on one contacting surface from the spraying of a solution of polybutadiene rubber in hexane, and the solvent evaporated.

After several months this mating combination was examined, and no hardening at the interface was apparent.

After subsequent mixing, the mixed compound cured normally to form an elastomeric thermosetting mass.

Figure 2:
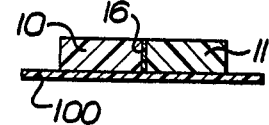
FIG. 2 is a section on lines 2—2 of FIG. 1.
Figure 3:
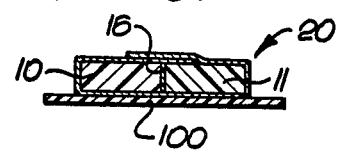
FIG. 3 is like FIG. 2, but after wrapping of the product.

FIG. 3 shows a protective over-wrap 20 on the product of FIG. 2. The wrap may consist of paper or other suitable material.

Figure 4:
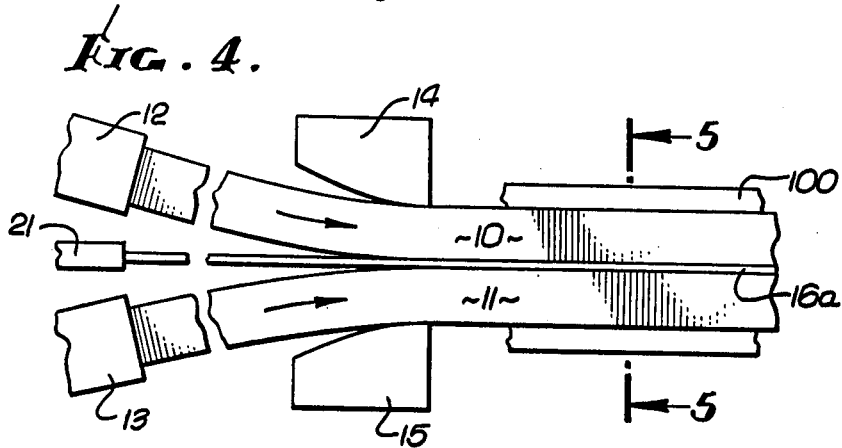
FIG. 4 is a view similar to FIG. 1, but showing co-extrusion of a barrier film or layer between two reactive masses being extruded.
Figure 5:
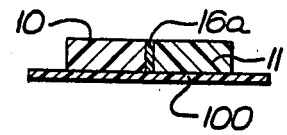
FIG. 5 is a section on lines 5—5 of FIG. 4.

The example shown in FIGS. 4 and 5 is like that of FIGS. 1 and 2, except that the film 16a is fed as a solid strip between the bands or masses 10 and 11. Strip 16a may be extruded, as at 21. It may for example consist of thermoplastic film or a rubber film.

Figure 6:
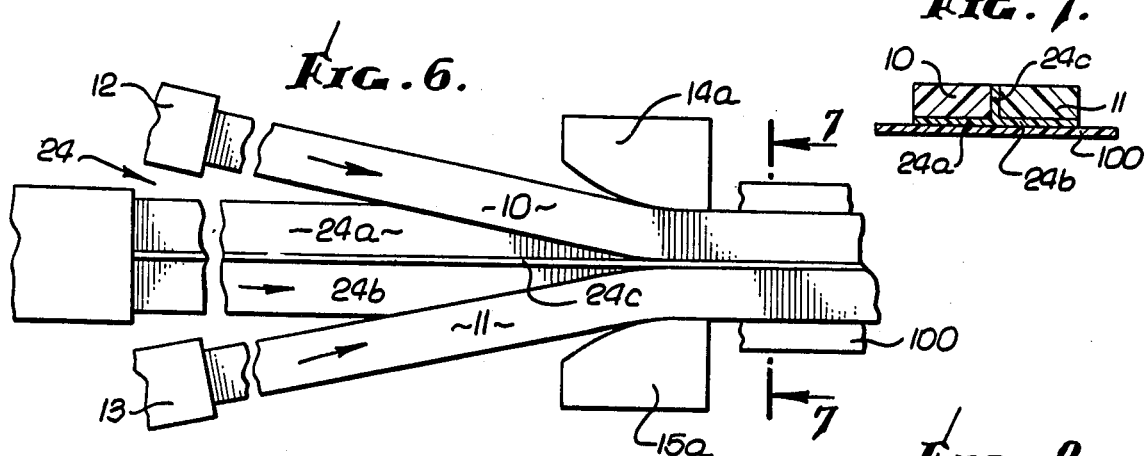
FIG. 6 is a view like FIG. 1 but showing co-extrusion of a carrier layer for the two reactive masses, the carrier also forming an integral barrier that feeds between the two reactive masses being co-extruded.
Figure 7:
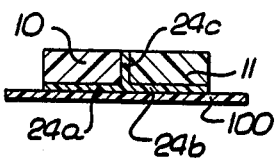
FIG. 7 is a section on lines 7—7 of FIG. 6.
Figure 8:
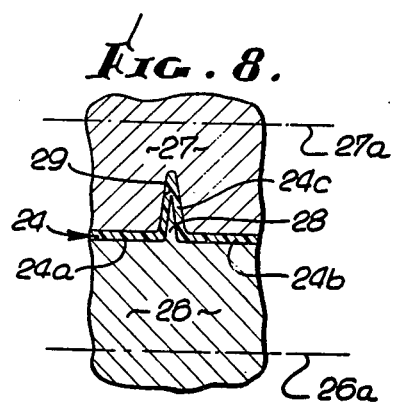
FIG. 8 is an enlarged section through dies which form the carrier and barrier layers of FIGS. 6 and 7.
Figure 10:
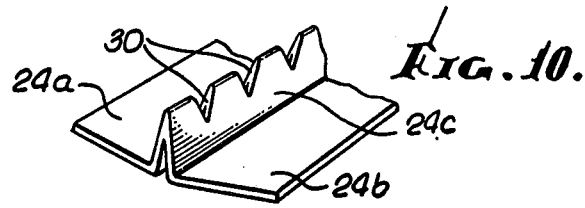
FIG. 10 shows a notched carrier configuration.

In FIGS. 6 and 7 the bands 10 and 11 are guided at 14a and 15a onto a carrier 24 having sections 24a and 24b respectively supporting the masses. The sections are supported on and moved rightwardly by surface 100 (such as a belt), to progressively receive the bands. A raised portion 24c of the carrier projects upwardly as a thin ridge or barrier between the bands, whereby the carrier has inverted T shaped configuration. It may consist of a thermoplastic film, and may be shaped as shown in FIG. 8, wherein male and female die rollers 26 and 27 are rotated about their axes 26a and 27a. A narrow annular projection 28 on die 26 deforms the thermoplastic film or sheet into annular recess 29 in die 27, to form the barrier 24c. Both dies may be heated to a temperature level aiding deformation of sheet 24. FIG. 10 shown the notching at 30 of the barrier portion 24c to more easily facilitate its rotation about rollers 26 and 27. Notching cutters may be associated with the rollers.

Figure 9:
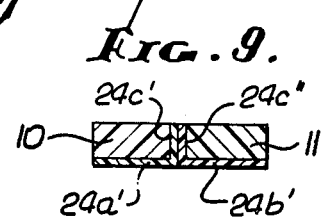
FIG. 9 is a section like that of FIG. 7, but showing an alternate multiple carrier and barrier construction.

Finally, FIG. 9 shows two separate carriers 24a' and 24b', with associated barrier portions 24c' and 24c". As is clear from FIG. 3, the barrier has a height dimension at least several times greater than barrier thickness, the barrier height being the same as mass height and throughout the lengths of the masses. Also, the wrap 20 has overlapping extents accessible adjacent surfaces of the masses which extend toward the barrier.

I claim:
1. A plastic hand kneadable package comprising
  (a) first and second extruded, mutually reactive self-supporting plastic masses which are kneadable together, said first mass consisting essentially of an admixture of filler, thixotropic material and reactive epoxy resin having an epoxy equivalent weight of 190 or less, the second mass consisting essentially of a reactive, non-flowing admixture of a polyfunctional amine and filler,
  (b) said masses extended in close side-by-side horizontally spaced apart relation, the masses being lengthwise elongated in parallel relation and having rectangular cross sections, and
  (c) a thin, flexible barrier between said masses blocking them against touching one another until such time as the masses are intentionally kneaded together for reaction, the barrier being in sprayed-on dried film state and being coated on a vertical side of at least one of the masses, the masses horizontally separated by the thickness of the film, the barrier characterized as essentially impermeable to reactive ingredients in the masses, the barrier consisting essentially of a film former dissolved in a solvent, the barrier being elongatable, (d) the barrier having a thickness characterized as resulting from spray application only of the barrier onto at least one vertically extending side of one of the self-supporting masses while said one mass is progressively advancing relative to the spray, the barrier having a height dimension at least several times greater than the barrier thickness, the barrier height dimension being the same throughout the lengths of the masses, (e) and a wrapping about said masses and barrier and having overlapping extents accessible adjacent flat surfaces of the masses which extend toward the barrier.

2. The package of claim 1 wherein the film former is selected from the group which consists of synthetic and natural gums, elastomers, synthetic vinyl compounds, cellulosic polymers, acrylic derivatives, and resins.

3. The package of claim 2 wherein the solvent is selected from the group that consists essentially of water, alcohol, ketones and esters.

* * * * *